Patented Nov. 25, 1947

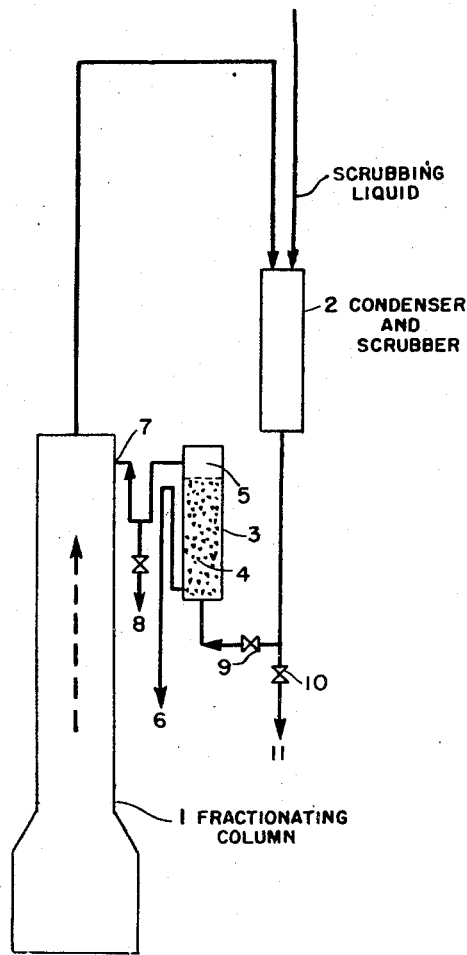

2,431,554

UNITED STATES PATENT OFFICE 2,431,554

PURIFICATION OF VINYL ACETATE BY DISTILLATION AND SCRUBBING OF THE DISTILLATE

Virgil L. Hansley, Niagara Falls, and Paul L. Magill, Ransomville, N. Y., assignors to E. I. du Pont de Nemours & Company, Wilmington, Del., a corporation of Delaware Application October 25, 1944, Serial No. 560,300

3 Claims. (Cl. 202—67)

This invention relates to a process for the removal of impurities from volatile organic liquids. More particularly, it relates to a combined process of distillation and extraction for the removal of such impurities from volatile organic liquids.

In conventional distillation methods for the separation of impurities from volatile organic liquids, it is frequently necessary to carry out the distillation by a series of elaborate and expensive stills requiring the redistillation of a considerable proportion of the liquid being purified. Such redistillation of intermediate cuts of liquids necessarily involves losses by volatilization and handling. If the liquid to be purified is polymerizable, losses due to unavoidable polymerization are also entailed.

It is an object of this invention to provide a new and improved process for the removal of impurities from vinyl acetate.

It is another object of this invention to provide a process for removal of impurities from vinyl acetate which very considerably simplifies the removal of traces of impurities that are difficult to separate from the liquids by straight-forward distillation.

It is a further object of this invention to provide a process for the removal of impurities from easily polymerizable volatile organic liquids such as vinyl acetate which will reduce the tendency of the liquid to polymerize.

It is yet another object of this invention to provide a distillation process for the removal of impurities from vinyl acetate which process involves an improvement in distillation efficiency, and a reduction in the rehandling of the liquid whereby losses by evaporation, and in some cases by polymerization, are greatly reduced.

It is still another object of this invention to provide an improved distillation process for the removal of traces of difficultly removable impurities from vinyl acetate, which process will reduce the period of the distillation and will reduce the tendency of the vinyl acetate to polymerize.

Other objects of the invention will appear hereinafter.

In accordance with the present invention, the above objects are accomplished by a combined distillation and liquid extraction process comprising subjecting the volatile, organic liquid containing impurities to distillation in a fractionating column, passing the vapors from the top of the fractionating column into direct contact with a scrubbing liquid whereby to condense and scrub the same simultaneously. The condensing and scrubbing liquid is substantially immiscible with the liquid (condensed vapors) but which will retain a proportion of the impurities, at a temperature below the boiling point of the distilled liquid, separating the distilled liquid from the scrubbing liquid, and returning the purified distilled liquid to the top of the fractionating column until the desired amount of impurities have been removed from the liquid being distilled, after which the purified liquid is collected.

The process of the present invention may be carried out by means of any suitable apparatus. The accompanying illustration shows one embodiment of apparatus suitable for this purpose. The following detailed description, when taken in connection with the accompanying drawing is believed to clearly disclose the principles of the invention to enable anyone skilled in the art to practice the same.

In the drawing the figure is a diagrammatic elevational view of a still and fractionating column combined with an extraction apparatus.

Referring to the figure of the drawing, reference numeral 1 designates a still pot and fractionating column into which the volatile organic liquid to be purified is placed and heated to vaporize the same. The vapors from the head of the fractionating column are passed to a condenser 2 into which a scrubbing liquid is slowly admitted at a temperature to condense the vapors. The scrubbing liquid may be composed of any liquid which is substantially immiscible with the condensed liquid and which will retain a substantial proportion of the impurity to be removed from the condensed liquid. The combined condensate and scrubbing liquid is conducted to the gravity separator 3 where the two liquids which are substantially immiscible with each other are separated into two layers 4 and 5. In the apparatus illustrated in the drawing, the scrubbing liquid is the heavier liquid and is automatically removed through over-flow pipe 6. The lighter condensate is passed from the layer 5 to the top of the fractionating column through pipe 7. Obviously, if the distillate were heavier than the scrubbing liquid, the lower layer would be passed to the top of the fractionating column and the upper layer would be removed by over-flow. The distillation and scrubbing operation is continued until a sample withdrawn at 11 indicates that the impurity has been removed from the distillate to the desired extent. The purified organic liquid is then collected at 11 by closing valve 9 and opening valve 10. During this final collection period, the scrubbing liquid may be continuously passed into the condenser 2 with the purified vapor to condense the latter, in which case the scrubbing liquid and purified condensate will have to be separated in another container. On the other hand, the condenser 2 may be provided with a cooling jacket, or cooling tubes, through which cooling liquid is circulated during final collection of the condensate, in which case no scrubbing liquid is passed into condenser 2 during the collection period.

The process, generally described above, has been found to be of particular utility in the purification of vinyl acetate containing difficultly removable impurities. This process has, for example, been found of great utility in the purification of vinyl acetate containing therein, as impurities, acetic acid and acetaldehyde. Vinyl acetate is very easily hydrolyzed to produce acetic acid and acetaldehyde and, therefore, it is very difficult to substantially free it from these hydrolysis products.

The following detailed example is given to illustrate the preferred procedures for the purification of vinyl acetate.

Example I

Crude vinyl acetate, 1000 cc., was charged into the distilling and extracting apparatus of Fig. 1. The composition of the crude charging stock was:

|  | Cc. |
|---|---|
| Vinyl acetate | 830 |
| Acetaldehyde, acetone, water | 90 |
| Acetic acid | 80 |

Plain water at the rate of 150 lbs./hr. was introduced into the condenser 2 in Fig. 1 with a 300 lb./hr. boil-up total reflux in still 1 until the head temperature reached 71° C. This temperature corresponded to a 0.03% total acetaldehyde and acetone content in the condensate returning to the still column. The scrubbing was accomplished on a continuous basis. The difference in specific gravity and immiscibility of the water and vinyl acetate gave an automatic overflow of each phase, the acetaldehyde and acetone going over 6 dissolved in water and the vinyl acetate phase returning to the column 7. The scrubbing was complete at the 71.0° C. head temperature and the following cuts were made at the 300 lb./hr. boil-up rate:

Cut (1) _____ 71.0° C. to 71.8° C. at 15:1 reflux
Cut (2) _____ 71.8° C. to 73.0° C. at 2:1 reflux
Cut (3) _____ 73.0° C. to 110.0° C. at 15:1 reflux Cuts 1 and 3 were returned to process and cut 2 was collected as specification grade vinyl acetate (max. 0.030% acetaldehyde).

Obviously, the invention is not to be limited to the particular extractants set forth. It is only necessary that the scrubbing liquid which is used for the extraction of impurities be substantially immiscible with the liquid to be purified and will retain some of the impurities to be removed. The choice of scrubbing liquid (extractant) will, of course, depend upon the physical and chemical character of the liquid to be purified and the impurity to be removed.

Since it is obvious that many changes and modifications can be made in the above-described details without departing from the nature and spirit of the invention, it is to be understood that the invention is not to be limited to the said details except as set forth in the following claims.

We claim:

1. A process for the removal of impurities from vinyl acetate which comprises subjecting said acetate containing impurities to distillation in a fractionating column, passing the vapors from the top of said column into contact with a scrubbing liquid at a temperature below the boiling point of the distilled liquid whereby to condense said vapors, said scrubbing liquid being immiscible with vinyl acetate but which will retain a proportion of said impurities, separating the vinyl acetate from the scrubbing liquid and returning the vinyl acetate to the top of said fractionating column until the desired amount of impurity has been removed therefrom, and collecting the purified vinyl acetate.

2. A process for the removal of acetaldehyde and acetone from vinyl acetate which comprises subjecting said acetate containing acetaldehyde and acetone to distillation in a fractionating column, passing the vapors from the top of said column into contact with a scrubbing liquid at a temperature below the boiling point of the distilled liquid whereby to condense said vapors, said scrubbing liquid being immiscible with vinyl acetate but which will retain a proportion of said aldehyde and acetone, separating the vinyl acetate from the scrubbing liquid and returning the vinyl acetate to the top of the fractionating column until the desired amount of aldehyde and acetone has been removed therefrom, and collecting the purified vinyl acetate.

3. A process for the removal of acetaldehyde and acetone from vinyl acetate which comprises subjecting said acetate containing acetaldehyde and acetone to distillation in a fractionating column, passing the vapors from the top of said column into contact with an aqueous solution of sodium bisulfite at a temperature below the boiling point of the distilled liquid whereby to condense said vapors and cause the condensed liquid to be scrubbed, separating the vinyl acetate from the scrubbing liquid and returning the vinyl acetate to the top of the fractionating column until the desired amount of acetaldehyde and acetone has been removed therefrom, and collecting the purified vinyl acetate.

VIRGIL L. HANSLEY.
PAUL L. MAGILL.

REFERENCES CITED

The following references are of record in the file of this patent:

UNITED STATES PATENTS

| Number | Name | Date |
|---|---|---|
| 2,350,719 | Bright et al. | June 6, 1944 |
| 2,281,311 | Knapp | Apr. 28, 1942 |
| 1,918,283 | Miller | July 18, 1933 |
| 2,388,844 | Hasche et al. | Nov. 13, 1945 |